Aug. 22, 1950  E. A. RING  2,519,852
OPHTHALMIC MOUNTING
Filed March 21, 1946
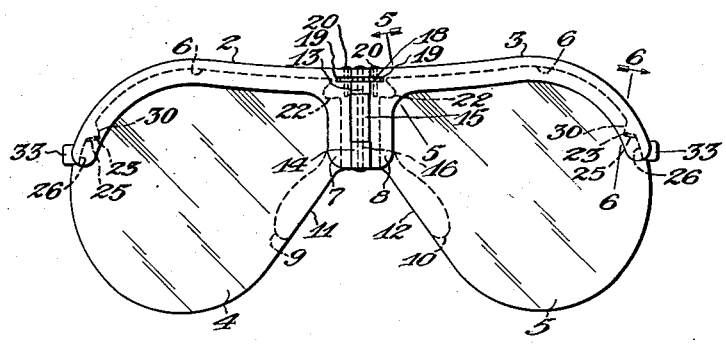
Fig. 1.
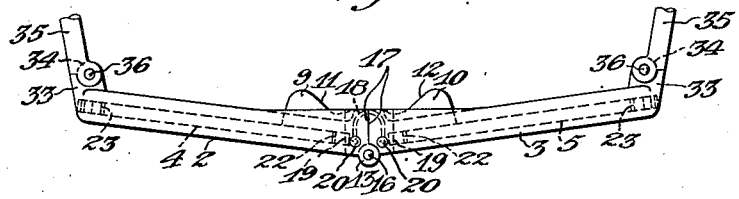
Fig. 2.
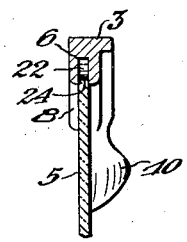
Fig. 5.
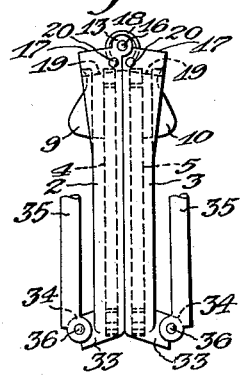
Fig. 3.
Fig. 6.
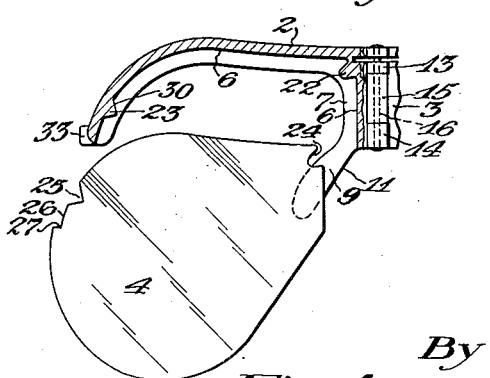
Fig. 4.
Inventor:
Ernest A. Ring
By
Attorneys.

Patented Aug. 22, 1950

2,519,852

UNITED STATES PATENT OFFICE 2,519,852

OPHTHALMIC MOUNTING

Ernest A. Ring, Providence, R. I., assignor of one-half to Francis M. Blakeney, Cranston, R. I.

Application March 21, 1946, Serial No. 655,993

3 Claims. (Cl. 88—41)

This invention relates to ophthalmic mountings and more particularly to a foldable eyeglass frame for detachably mounting a pair of lenses to provide for their removal and replacement due to breakage or for other purposes.

One object of the invention is to provide a foldable frame for eyeglasses, goggles or nightglasses which can be contracted into small compass for carrying it in a case while possessing the necessary rigidity when open whereby to properly support the lenses.

Another object is to provide an eyeglass or spectacle frame having resilient members for receiving the lenses and hold them in place by engagement of their notched edges with detent projections on the frame.

Another object is to provide an eyeglass or spectacle frame having pivotally connected arms for mounting a pair of lenses with said arms adapted to be held in extended relationship or folded together under the control of yieldable means.

Another object is to provide a light-weight frame constructed of plastic or similar material with oppositely-extending members pivoted together at their inner ends and held in either extended or folded relationship by means of a spring arranged to be displaced on opposite sides of the pivot during the folding or unfolding of the members or arms.

Further objects of the invention are set forth in the following specification which describes a preferred form of construction of the eyeglasses or spectacles as illustrated by the accompanying drawings. In the drawing:

Fig. 1 is a front view of a pair of eyeglasses or spectacles constructed in accordance with the present invention;

Fig. 2 is a plan view of the same;

Fig. 3 is a plan view showing the parts of the frame and the lenses in closely folded relationship;

Fig. 4 is a fragmentary view showing one of the frame-members or arms partly in section with the lens removed therefrom to illustrate the attaching means therefor;

Fig. 5 is a sectional view on line 5—5 of Fig. 1 showing the manner in which a projection on the frame engages with a notch in the lens; and Fig. 6 is a sectional view of line 6—6 of Fig. 1 showing the interengagement between another projection and a second notch in the lens.

As usually constructed, eyeglasses and spectacles have substantially rigid frames which render them quite bulky and rather inconvenient to carry in cases held in the pocket. In some instances eyeglass frames have been made of spring metal to adapt the lenses to be placed one in opposed relation to the other to confine them to small compass, but such frames are subject to twisting and liable to misalinement of the lenses and therefore are not used to any great extent at the present time. The present invention contemplates an important improvement over such types of eyeglasses or spectacles by providing a frame which may be held substantially rigid with the lenses accurately spaced and maintained in proper relationship for use and yet capable of being folded into small compass for carrying in a case.

Referring to the accompanying drawing, the present improved frame may comprise two opposite members or arms 2 and 3 connected at the center by a hinged joint and extending outwardly therefrom. The arms 2 and 3 are shaped to conform to the peripheral contour of the lenses 4 and 5 and are provided with grooves 6 on their under sides for receiving the edges thereof. The inner ends of the two arms 2 and 3 are formed with downwardly-projecting extensions or posts 7 and 8 terminating in angular nose-guards 9 and 10 which diverge from the center and have relatively flat faces 11 and 12 for contact with the sides of the wearer's nose. Above the nose-guard 9 the member 2 may have a pair of hubs or bosses 13 and 14 offset forwardly of the post 7 while the opposite arm 3 may be provided with a longer hub 15 off-set forwardly of its post 8. The hubs 13, 14 and 15 are arranged to interleave and are bored axially to receive a pivot-pin 16 headed over at its opposite ends to hold it in place for hingedly connecting the two arms 2 and 3 of the frame. As shown more particularly in Figs. 2 and 3, the arms 2 and 3 are provided with relatively flat faces 17 adapted to engage in abutting relationship when the two arms are extended in substantial alinement, see Fig. 2.

A substantially horseshoe-shaped wire spring 18 is located in a narrow slot 19 cut into the abutting ends of the arms 2 and 3 with the ends of the wire fastened to a pair of pins 20 inserted through holes at the top of the arms and passing across the slot. As shown more particularly in Fig. 1, the ends of the spring 18 may be bent to form loops engaging around the pins 20 or the spring may be fastened thereto in any other suitable manner. When the arms 2 and 3 of the frame are extended the spring 18 will project rearwardly of the pivot-pin 16, see dotted lines in Fig. 2, and exert a force to hold the arms in this relationship. When, however, the arms 2 and 3 are swung forwardly and closed together into the relationship shown in Fig. 3 the spring 18 will be caused to encircle the pivot-pin 16 to exert its force in the opposite direction to resiliently maintain the parts of the frame folded. Stated another way, the spring 18 is adapted to be displaced across the axis of the pivot-pin 16 or, in other words, shifted across center, so that its tension will act to yieldably hold the arms 2 and 3 of the frame in either extended relationship as shown in Fig. 2, or folded together as illustrated in Fig. 3. By this form of construction and arrangement of the spring 18 the two arms 2 and 3 of the frame are held substantially rigid when extended and also yieldingly maintained in close relationship when folded.

Referring particularly to Figs. 1 and 4, each arm 2 and 3 of the frame is substantially straight from its inner end outwardly throughout a portion of its length and then curved downwardly in arcuate form with the narrow slot or groove 6 extending its full length and also down through the depending vertical post 7 or 8. As shown in Fig. 5, the groove 6 is of a width to adapt the appropriate lens 4 to fit snugly thereinto, the contour of its edge at the top of the lens being the same as that of the arm. At the inner end of each arm there is a pointed lug or projection 22 where the arm joins its post 7 or 8, directed downwardly into the groove 6, and at the outer end of each arm is another sharper projection or lug 23 also located in the groove 6.

Referring to Fig. 4, the lens 4 has a notch 24 cut into its edge interrupting the straight portions at the juncture thereof with its upper edge, this notch being shaped to the same contour as the projection 22 and dimensioned to adapt the lug to fit snugly thereinto. On the outer curved edge of the lens 4 is a notch 25 shaped to the contour of the projection 23 on the arm 2 but slightly larger than the latter and below this point the edge of the lens is cut away at 26 to form a laterally extending shoulder 27. By the provision of the projections or lugs 22 and 23 and the notches 24 and 25 the lens 4 may be inserted into the groove 6 in the arm 2 with the lug 22 fitting snugly into the notch 24, and then by pressing the outer portion of the lens snugly into the groove the pointed projection 23 will snap into the notch 25, the arm 2 yielding resiliently to permit this engagement between the lugs and the notches in the lens. During this engagement of the edge of the lens in the slot or groove 6 in the arm 2 the lateral side 30 of the lug 23 will engage securely with the corresponding edge of the notch 25, a slight clearance being left between the lower face of the lug and the opposite edge of the notch, as shown most clearly by dotted lines in Fig. 1. As the lens is forced into place in the groove 6 of the arm 2 and the lugs 22 and 23 engaged with its notches 24 and 25 the shoulder 27 on the lens will bring up against the end of the arm to provide for securely gripping the lens to the arm and tending to force the lens into the groove 6 in the post 7 of the arm. It has been stated that the present improved frame is adapted to be used for either eyeglasses or spectacles and in the latter case the ends of the arms 2 and 3 may be provided with rearwardly projecting hinge-lugs 33 adapted for connection with the slotted hub-portions or bosses 34 at the ends of a pair of temples or bows 35, indicated in Figs. 2 and 3, with pins 36 pivotally connecting the temples to the frame. The temples may be of a type contractible in extent to conform with the reduced length of the frame when its parts are folded together.

It will be observed from the foregoing specification that the present invention provides an extremely simple yet practical form of ophthalmic mounting having oppositely-extending members or arms 2 and 3 pivoted together at the center to adapt them to be held in extended relationship or folded together to contract the glasses into a minimum space; and also comprising means for detachably mounting the lenses in the frame so that they may be removed for replacement; for example, should one or both lenses become broken, or in other cases where it is desired to change the prescription of the lenses. The invention is herein shown more particularly as of a form designed particularly for use in goggles or night-glasses and the feature of the detachable lenses provided for changing smoked or colored lenses to those more particularly adapted for night use.

In the normal arrangement of the frame, for use with eyeglasses, spectacles or goggles, the hinged members or arms carrying the lenses are held rigidly in extended relationship, as shown in Figs. 1 and 2, by means of the over-center position of the spring 18 which acts to maintain the arms with their flat ends in closely abutting engagement. On the other hand, when the two arms 2 and 3 are folded toward each other into the position shown in Fig. 3 the spring 18 will be displaced across the center of the pivot whereby it will maintain the two arms 2 and 3 folded into overlapping relationship.

While the invention is herein shown and described as embodied in a preferred form of construction, it is to be understood that various modifications may be made in the structure and arrangement of its parts without departing from the spirit or scope of the invention as expressed in the following claims. Therefore, without limiting myself in this respect, I claim:

1. In an ophthalmic mounting, a pair of corresponding frame-members having portions adapted to overlie the edges of a pair of lenses with means for attaching the lenses thereto, said members provided with inter-leaved bearing bosses, a pin in said bosses for pivotally connecting the ends of said members, and a spring of substantially horseshoe shape having its opposite ends respectively connected to the two members and arranged to be shifted across the axis of the pivot-pin in one direction when the members are placed in extended relationship and in the opposite direction when said members are folded together into overlying relationship.

2. In a ophthalmic mounting, a pair of opposite frame-members having means for supporting a pair of lenses, cooperating bearing portions on said frame-members, a pivot-pin connecting said bearing portions of the frame-members to adapt said members to fold toward each other, said bearing portions having abutments adapted to engage when the frame-members are extended with the lenses in substantial alinement, and a spring of substantially horseshoe-shape having its opposite ends respectively connected to the two frame-members and arranged to be shifted across the axis of the pivot-pin in one dirtction when the frame-members are placed in extended relationship and in the opposite direction when said frame-members are folded together in overlying relationship, said spring thereby acting to yieldingly hold the frame-members in either extended or folded relationship.

3. In an ophthalmic mounting, a pair of frame-members having means for supporting a pair of lenses, said frame-members formed with bearing hubs at their ends with abutment portions having faces projecting substantially radially from the axis of said hubs, a pivot-pin extending through bores in the bearing hubs to hingedly connect the two frame-members and adapt them to be extended in substantial alinement with the faces of their abutment portions in engagement, and a spring of substantially horseshoe-shape held in slots in the abutment portions of the frame-members with its opposite ends respectively connected to the two frame-members and arranged to be shifted across the axis of the pivot-pin in one direction when the frame-members are placed in extended relationship and in the opposite direction when said frame-members are folded together with the lenses in overlying relationship.

ERNEST A. RING.

REFERENCES CITED

The following references are of record in the file of this patent:

UNITED STATES PATENTS

| Number | Name | Date |
| --- | --- | --- |
| 140,912 | Graecen | July 15, 1873 |
| 1,113,194 | Carson | Oct. 13, 1914 |
| 1,278,418 | Bader | Sept. 10, 1918 |
| 1,789,937 | Curran | Jan. 20, 1931 |
| 2,254,746 | Line | Sept. 2, 1941 |
| 2,327,802 | Kelley | Aug. 24, 1943 |
| 2,385,975 | Ellestad | Oct. 2, 1945 |

FOREIGN PATENTS

| Number | Country | Date |
| --- | --- | --- |
| 12,089 | Great Britain | June 9, 1905 |